UNITED STATES PATENT OFFICE 2,435,307

METAL-PHTHALOCYANINES CONTAINING HALO-METHYL GROUPS AND PROCESS OF PREPARING SAME

Norman Hulton Haddock and Clifford Wood, Blackley, Manchester, England, assignors to Imperial Chemical Industries Limited, a corporation of Great Britain No Drawing. Application March 12, 1946, Serial No. 653,956. In Great Britain November 17, 1944

11 Claims. (Cl. 260—314.5)

This invention relates to new phthalocyanine derivatives and more particularly it relates to phthalocyanine derivatives bearing chloromethyl or bromomethyl substituents.

According to the invention we manufacture new phthalocyanine derivatives by a process which comprises heating a metal or a metal-free substituted or unsubstituted phthalocyanine with aluminium chloride and with sym-dichlorodimethyl ether or sym-dibromodimethyl ether, or a substance which in presence of aluminium chloride acts in the same manner as does sym-dichlorodimethyl ether, and preferably in presence of a tertiary amine not itself susceptible of chloro- or bromo-methylation.

As metal phthalocyanines which may be treated according to the process of the invention there may be mentioned for example copper, nickel, iron and aluminium phthalocyanines, copper octa-3:6-chlorophthalocyanine, copper tetra-4-phenylphthalocyanine and copper tetra-4-benzoylphthalocyanine.

Metal free phthalocyanines may also be used. The products when these are used contain aluminium phthalocyanine derivatives.

The tertiary amine which is preferably used in the process of the invention is, as said, such that it is not itself susceptible of chloro- or bromo-methylation; thus it must not contain benzenoid nuclei or other reactive groups towards chloro- or bromo-methylating agents for example hydroxyl groups. Thus for example triethylamine or pyridine may be used whereas dimethylaniline or triethanolamine may not.

As a substance which, in the presence of aluminium chloride acts in the same manner as does sym-dichlorodimethyl ether there may be used for example paraformaldehyde.

The process of the invention may be carried out by mixing together aluminium chloride, the tertiary base and the chloro- or bromo-methylating agent and adding to the mixture the phthalocyanine derivative it is desired to chloro- or bromo-methylate. There is formed a dark brown liquid which is then heated, the duration and temperature of the heating being adjusted according to the number of chloro- or bromo-methyl groups it is desired to introduce. Generally heating during about an hour is a convenient period and the number of chloro- or bromo-methyl groups introduced can best be adjusted by variations of temperature. Suitable temperatures which may be used vary from about 20° C. to 95° C. or higher. The influence of varying the proportion and nature of the reactants and the duration and temperature of heating on the number of chloromethyl groups introduced is exhibited in the table below which shows the number of chloro-methyl groups introduced into copper phthalocyanine (5 parts by weight) under a variety of conditions. The quantities are given in parts by weight.

| AlCl₃ amount | Chloromethylating Agent | | Tertiary Amine | | Heating | | No. of chloromethyl groups |
|---|---|---|---|---|---|---|---|
| | Nature | Amount | Nature | Amount | Temp., °C. | Duration, Minutes | |
| 30 | Dichlorodimethyl ether | 6.5 | Triethylamine | 11 | 60–62 | 20 | 2.8 |
| 30 | ....do.... | 6.5 | ....do.... | 11 | 60–62 | 60 | 3.2 |
| 30 | ....do.... | 6.5 | ....do.... | 11 | 70–72 | 60 | 3.4 |
| 30 | ....do.... | 6.5 | ....do.... | 11 | 70–72 | 180 | 3.6 |
| 30 | ....do.... | 6.5 | ....do.... | 11 | 80–82 | 60 | 3.8 |
| 30 | ....do.... | 6.5 | ....do.... | 11 | 90–92 | 60 | 3.92 |
| 30 | ....do.... | 6.5 | ....do.... | 11 | 95±2 | 60 | 3.0 |
| 40 | ....do.... | 6.5 | Pyridine | 10 | 60–65 | 45 | 3.8 |
| 40 | Paraform | 5 | Triethylamine | 3.6 | 75–80 | 60 | 2.5 |
| 30 | Dichlorodimethyl ether | 10 | None | | 60±2 | 60 | 1.7 |

The products obtained are highly-reactive substances and may be caused to react for example with tertiary amines to give quaternary ammonium salts, with mercaptans to give sulphides, and with thiourea to give isothiouronium salts. They are thus of value as intermediates in the manufacture of dyestuffs and pigments.

The invention is illustrated but not limited by the following examples in which parts are by weight.

*Example 1*

To 30 parts of coarsely powdered anhydrous aluminium chloride 11 parts of anhydrous triethylamine are gradually added. The temperature of the mixture, which becomes liquid, rises during this addition to about 150° C. The mixture is stirred, and allowed to cool to 60° C., and then 6.5 parts of sym-dichlorodimethyl ether are added, the temperature being kept below 70° C. The resulting grey mixture is cooled to 55° C. and stirred while 5 parts of finely powdered copper phthalocyanine are added to it in portions, the temperature being kept between 55° and 60° C. A deep brown liquid is thus obtained. This liquid is heated at 60±2° C. during 60 minutes, and it is then poured into 100 parts of cold water containing 30 parts of concentrated hydrochloric acid, ice being added at intervals in quantities such that the temperature is maintained between 20° and 30° C. The bright blue suspension so obtained is filtered and the blue solid is washed free from acid with water and finally washed twice with alcohol. It is then dried at 60° C. and 6 parts of a bright blue powder are obtained. It contains 15% of chlorine and consists substantially of copper tri(chloromethyl)phthalocyanine.

Example 2

A mixture of 30 parts of anhydrous aluminium chloride and 10 parts of sym-dichloro-dimethyl ether is heated at 60° C. until the aluminium chloride has dissolved and 5 parts of finely powdered copper phthalocyanine are then added in portions to the almost clear melt keeping the temperature between 55° and 60° C. The resulting brown liquid is heated at 60°±2° C. during 60 minutes and it is then drowned into 100 parts of water containing 30 parts of concentrated hydrochloric acid, ice being added at intervals in quantities sufficient to maintain the temperature between 20° and 30° C. The bright blue suspension is filtered and the separated solid is washed acid-free with water, and then it is washed twice with alcohol. It is then dried at 60° C. and 5.6 parts of a bright blue powder are obtained. This contains 9.1 to 9.5% chlorine and consists essentially of copper di(chloromethyl)phthalocyanine.

Example 3

The process described in Example 1 is repeated but the final heating is conducted at 85–90° C. instead of at 60±2° C. The product obtained consists of 7 parts of a dark blue powder containing 18.2 to 18.5% of chlorine and is essentially copper tetra(chloromethyl)phthalocyanine.

Example 4

10 parts of dry pyridine are added to 40 parts of coarsely powdered anhydrous aluminium chloride, the temperature being allowed to rise to about 150° C. A clear liquid is obtained which is cooled to 65° C. and 6.5 parts of sym-dichlorodimethyl ether are added, the temperature being kept below 70° C. The pale grey mixture is cooled to 55° C. and 5 parts of finely powdered copper phthalocyanine are added, the temperature being kept below 60° C. The resulting brown liquid is heated at 60±2° during 60 minutes and the product is then isolated as described in Example 1. 6.4 parts of a substance containing 18% of chlorine are obtained in the form of a bright blue powder. This consists essentially of copper tetra(chloromethyl)phthalocyanine.

Example 5

3.6 parts of anhydrous triethylamine are added slowly to 40 parts of anhydrous aluminium chloride, and the mixture is stirred and heated at 150–160° C. until all the aluminium chloride is dissolved. The grey mixture is cooled to 80° C. and 5 parts of paraformaldehyde are added, the temperature being kept between 80° and 85° C. The mixture is then cooled to 75° C. and 5 parts of copper phthalocyanine are added, the temperature being kept at 75°–80° C. The resulting brown mixture is heated at 75°–80° C. for 1 hour, and the product is then isolated as described in Example 1. 5.6 parts of a bright blue powder are obtained. This product contains 12.6% chlorine and is a mixture of copper di(chloromethyl)phthalocyanine and copper tri(chloromethyl)phthalocyanine.

Example 6

11 parts of anhydrous triethylamine are added to 30 parts of anhydrous aluminium chloride as described in Example 1. The mixture is cooled to 60° C. and 12 parts of sym-dibromodimethyl ether are added, the temperature being kept at 60–70° C. 5 parts of copper phthalocyanine are then added, the temperature being kept between 55° and 60° C. The resulting brown liquid is heated at 75°–80° C. during 1 hour. The product is isolated as described in Example 1. There is thus obtained 7.3 parts of a bright blue powder. It contains 27.1% of bromine and 2.7% of chlorine and consists substantially of copper tri(bromomethyl)phthalocyanine.

Example 7

In place of the 5 parts of copper phthalocyanine employed in Example 1 there are used 5 parts of nickel phthalocyanine. The product is a greenish-blue powder, containing 13.3% chlorine, and it is a mixture of nickel di(chloromethyl)phthalocyanine and nickel tri(chloromethyl)phthalocyanine.

Example 8

In place of the 5 parts of copper phthalocyanine employed in Example 1 there are used 4.5 parts of metal-free phthalocyanine. There are thus obtained 4 parts of a greenish-blue powder, which contains 16.6% of chlorine and 1.62% of aluminium. It consists principally of tri(chloromethyl)phthalocyanine.

Example 9

In place of the 5 parts of copper phthalocyanine employed in Example 1, there are used 5 parts of copper tetra-4-benzoylphthalocyanine, which may be obtained as described in British patent specification No. 468,043, and instead of 6.5 parts of sym-dichlorodimethyl ether 3.9 parts of this substance are used. 5.5 parts of a greenish blue powder, containing 12.2% of chlorine, are obtained. It consists principally of copper tetra-(chloromethyl)-tetra-4-benzoylphthalocyanine.

Example 10

A mixture of 100 parts of anhydrous aluminium chloride and 132 parts of sym-dichlorodimethyl ether is stirred until the aluminium chloride has dissolved and 10 parts of copper tetra-4-phenylphthalocyanine are added, keeping the temperature between 20° C. and 25° C. The resulting dark grey solution is stirred at 25° C. during 60 minutes, and it is then poured into a mixture of 300 parts of water and 90 parts of concentrated hydrochloric acid, the temperature being kept between 20° C. and 30° C. by addition of ice as necessary. The mixture is filtered and the green solid residue is washed first with water until it is free from acid and then with ethyl alcohol. It is then dried at 60° C. and a bright green powder is thus obtained. It contains 22.5% of chlorine and consists principally of copper octa-(chloromethyl)-tetra-4-phenylphthalocyanine.

Example 11

10 parts of pyridine are added to 40 parts of anhydrous aluminium chloride and the mixture is heated at 140°–150° C. until the aluminium chloride dissolves. The solution is cooled to 65° C. and 13 parts of sym-dichlorodimethyl ether are added thereto. The mixture is then cooled to 50° C. and 5 parts of copper tetra-4-thiocyanophthalocyanine are added slowly at 50°–53° C. The reaction mixture is stirred at 50–53° C. during 10 minutes and then poured into a mixture of 100 parts of water and 30 parts of concentrated hydrochloric acid, the temperature being kept between 20° and 30° C. by the addition of ice as necessary. The green suspension is filtered and the separated solid is first washed with water until free from acid, and then with ethyl alcohol. It is then dried at 60° C. and 5.5 parts of a dark green powder are obtained. It contains 11.2% of chlorine and consists substantially of copper tri-(chloromethyl)-tetra-4-thiocyanophthalocyanine.

*Example 12*

The process described in Example 4 is repeated, but the final heating is conducted at 65°–67° C. instead of at 60° C. The product obtained is a bright blue powder and contains 23% of chlorine. It is a mixture of copper penta-(chloromethyl)-phthalocyanine and copper hexa-(chloromethyl)-phthalocyanine.

*Example 13*

A mixture of 5.72 parts of copper tetra-4-phenyl-phthalocyanine, 100 parts of nitrobenzene and 22 parts of anhydrous aluminium chloride is stirred for 10–15 minutes. A solution of 6 parts of sym-dichlorodimethyl ether in 25 parts of nitrobenzene is then added to the mixture during 15 minutes at 25°–30° C. The mixture is then maintained at 25–30° C. during 3 hours and then 20 parts of 20% aqueous hydrochloric acid are added sufficiently slowly so that the temperature does not rise above 30° C. 200 parts of ethyl alcohol are then added, and the mixture is filtered. The residual solid is washed with ethyl alcohol and then with water. It is then boiled with 200 parts of 5% aqueous hydrochloric acid, the resulting mixture is filtered and the residual solid is washed free from acid with water. It is dried at 60° C. and a bright green powder is obtained. It contains 13% of chlorine and consists principally of copper tetra-(chloromethyl)-tetra-4-phenylphthalocyanine.

We claim:
1. A phthalocyanine compound of the general formula $Q-(CH_2X)_n$, wherein Q is the radical resulting from the removal of $n$ hydrogen atoms from the phenylene nuclei of a metal-phthalocyanine, X stands for a halogen atom of the group consisting of Cl and Br, and $n$ is a numeral not less than 1.
2. A copper phthalocyanine compound characterized by bearing in at least one of its phenylene nuclei at least one radical selected from the group consisting of $CH_2Cl$ and $CH_2Br$.
3. Tri(chloromethyl)-copper-phthalocyanine.
4. Tetra(chloromethyl)-copper-phthalocyanine.
5. Copper tetra(chloromethyl)-tetra-4-phenyl-phthalocyanine.
6. Process for the manufacture of phthalocyanine compounds having reactive side chains, which comprises reacting a phthalocyanine compound selected from the group consisting of metal-phthalocyanines and metal-free-phthalocyanines, and having at least one position in at least one of its phenylene nuclei unsubstituted, with a member of the group consisting of symmetrical dichlorodimethyl-ether, symmetrical dibromo-dimethyl-ether and paraformaldehyde, in the presence of aluminum chloride.
7. A process as in claim 6, wherein the reaction is carried out in the further presence of a tertiary nitrogenous base which is free of benzenoid nuclei and free of substituents which are reactive toward chloromethylating agents.
8. Process for the manufacture of a copper-phthalocyanine compound having at least one $CH_2Cl$ radical in at least one of its phenylene nuclei, which comprises reacting a copper-phthalocyanine compound having at least one free position in at least one of its phenylene nuclei, with symmetrical dichloro-dimethyl-ether in the presence of aluminum chloride.
9. A process as in claim 8, the reaction being carried out in the further presence of a nitrogenous tertiary base which is free of benzenoid nuclei and free of substituents which are reactive toward dichloro-dimethyl-ether.
10. A process as in claim 8, the reaction being carried out in the further presence of triethylamine.
11. A process as in claim 8, the reaction being carried out in nitrobenzene.

NORMAN HULTON HADDOCK.
CLIFFORD WOOD.

REFERENCES CITED

The following references are of record in the file of this patent:

FOREIGN PATENTS

| Number | Country | Date |
|---|---|---|
| 496,683 | Great Britain | Dec. 5, 1938 |